July 14, 1931.  F. HODGKINSON  1,814,628
COMPOUND TURBINE AND CONDENSER ARRANGEMENT
Filed April 30, 1930   2 Sheets-Sheet 2

WITNESS

INVENTOR
Francis Hodgkinson.
BY
ATTORNEY

Patented July 14, 1931

1,814,628

UNITED STATES PATENT OFFICE

FRANCIS HODGKINSON, OF PHILADELPHIA, PENNSYLVANIA, ASSIGNOR TO WESTINGHOUSE ELECTRIC & MANUFACTURING COMPANY, A CORPORATION OF PENNSYLVANIA

COMPOUND TURBINE AND CONDENSER ARRANGEMENT

Application filed April 30, 1930. Serial No. 448,747.

My invention relates to a compound turbine and condenser arrangement, and it has for its object to provide an arrangement permitting apparatus of greater capacity to be placed in a given space.

A further object is to provide a compact arrangement of the character set forth wherein the parts of the apparatus are accessible for overhauling.

In the turbine arrangement usually known as the cross-compound turbine, the first portion of the complete expansion of the motive fluid is carried out in a high-pressure turbine driving its own generator, the exhaust from this turbine being led to a low-pressure turbine, which, in turn, drives its generator. Heretofore, these turbines have been arranged in power plants one beside the other, with the condenser below the low-pressure turbine. In some cases, the condensers have been arranged in vertical positions alongside of the low-pressure turbines. With the turbine generators arranged side-by-side in this manner, a large amount of space is occupied.

In accordance with my invention, the high-pressure and low-pressure portions of the installation are located one above the other and the condenser is connected to the low-pressure turbine. The condenser comprises two branches or sections extending toward opposite sides of the high-pressure portion and providing space therebetween for access to the parts of the high-pressure portion.

Figure 1:
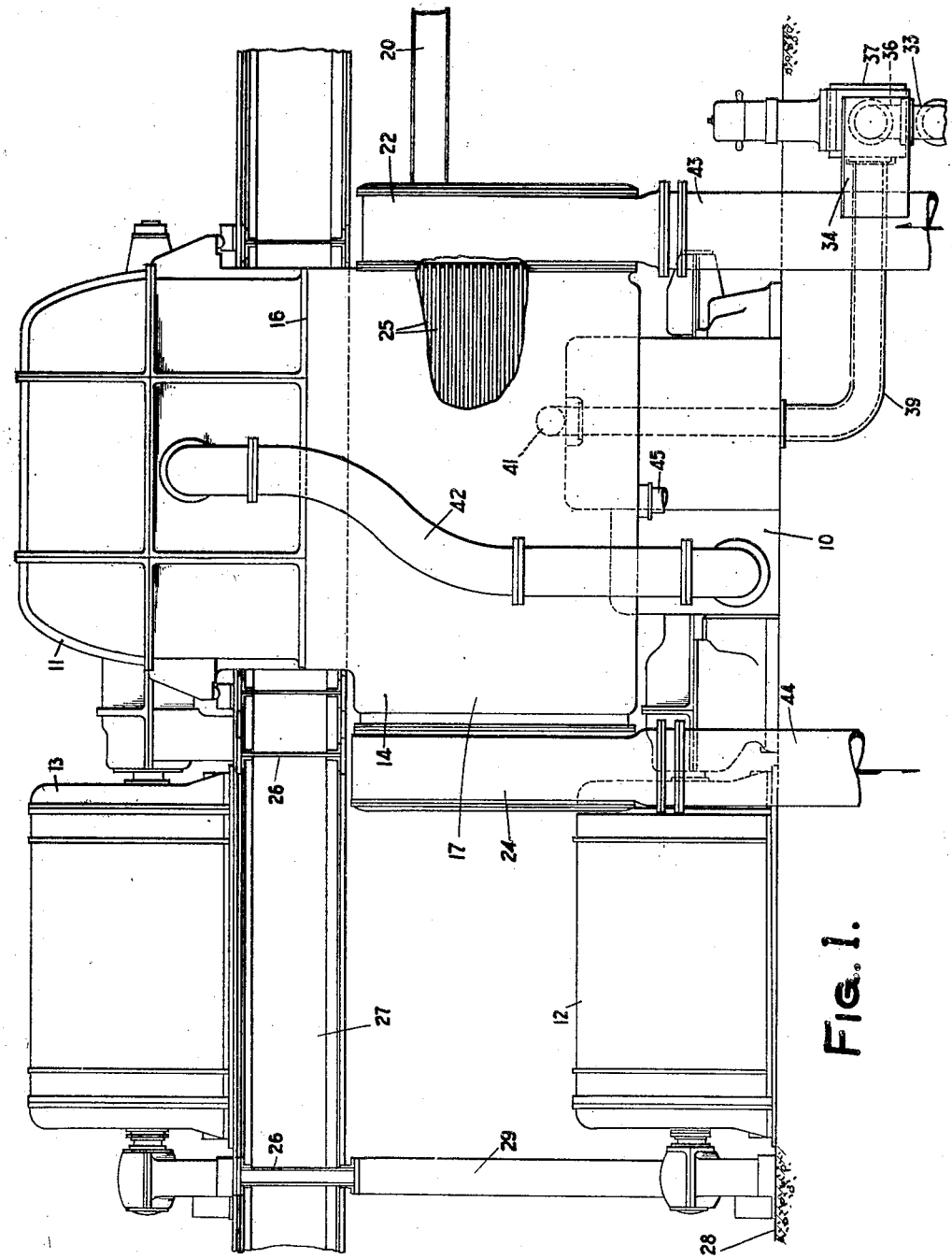
Figure 2:
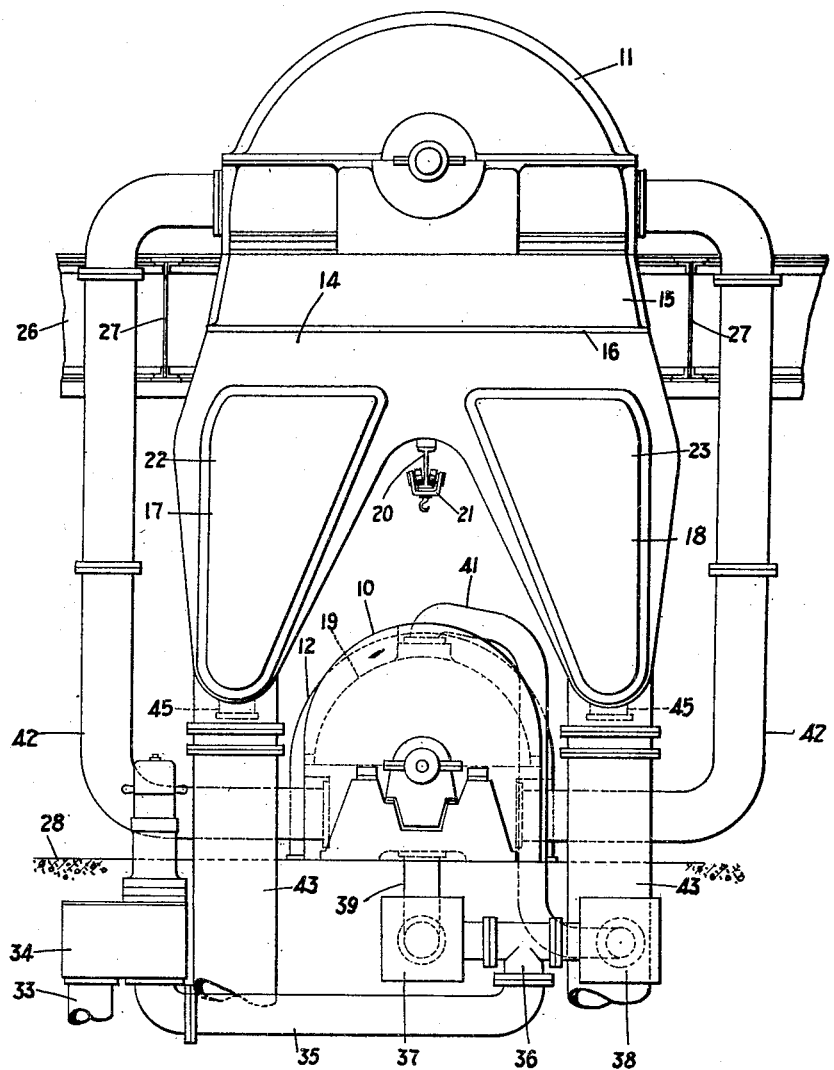

The above and other objects are effected by my invention, as will be apparent from the following description and claims taken in connection with the accompanying drawings, forming a part of this application, in which:

Fig. 1 is a side elevation of the compound turbine and condenser arrangement; and, Fig. 2 is an end elevation thereof, as seen from the right in Fig. 1.

Referring now to the drawings more in detail, I show a cross-compound turbine consisting of a high-pressure turbine 10 and a low-pressure turbine 11. The turbines 10 and 11 are directly coupled to and drive electric generators 12 and 13, respectively. The turbine 11 and the generator 13, constituting the low-pressure portion of the installation, are disposed in parallel relation to and directly above the turbine 10 and the generator 12, constituting the low-pressure portion.

A condenser 14 is disposed below the low pressure turbine 11, and is connected to the exhaust chamber 15 thereof along the horizontal plane indicated at 16. The condenser is divided into two branches or sections 17 and 18, extending from the turbine exhaust chamber 15 downwardly on opposite sides of the high pressure turbine 10 below the top thereof.

The lower portions of the condenser sections are arranged to provide a space therebetween which is sufficient to accommodate the upper part of the high-pressure turbine, and also to permit raising of the cover and other parts thereof for assembling and removing the same.

The high-pressure turbine is illustrated as covered with lagging, and the cover of the casing is indicated at 19 in dotted lines.

In order to facilitate removal of the cover 19 and the other parts of the high-pressure turbine, or the entire turbine, a rail 20, on which suitable lifting gear 21 may be suspended, is secured to the condenser 14 at the apex of the space between the sections. The rail 20 extends a suitable distance beyond one end of the condenser.

In the embodiment shown on the drawings, the condenser sections 17 and 18 are provided with separate water boxes, the inlet water boxes being shown at 22 and 23, respectively, and the outlet water box of the section 17 being shown at 24. The tubes in each section extend parallel to the axes of the turbines, as indicated at 25. As will be apparent from Fig. 1, the present arrangement enables convenient access to the condenser. The tubes may be readily removed through the outlet water boxes and through the space between the generators 12 and 13.

Circulating water is supplied to the inlet water boxes through conduits 43, and discharged from the outlet water boxes through conduits 44. Each of the condenser sections is provided with a condensate outlet 45.

The low-pressure portion of the installation is supported in any suitable manner. As shown, said portion rests on a horizontal beam structure comprising transverse beams 26 and longitudinal beams 27. From this structure, the weight is transmitted to the foundation at 28 through vertical columns, one of which is shown at 29.

Motive fluid may be supplied to the turbines in any suitable manner, for example, the arrangement shown on the drawings may be used, in which motive fluid from any suitable source is received through a conduit 33. From the conduit 33, the motive fluid passes through a combined steam strainer and throttle valve indicated at 34 and then to a conduit 35, in which there is interposed a T-fitting 36 for distributing the motive fluid to a primary steam chest 37 and a secondary steam chest 38. From the primary steam chest 37, motive fluid is admitted through a conduit 39 into the high pressure turbine 10 at the bottom thereof, and motive fluid passing through the secondary steam chest 38 is admitted at the top of the turbine through a conduit 41.

The motive fluid is partially expanded in the high-pressure turbine 10 and then exhausted into receiver pipes 42 in which it is conveyed to the low-pressure turbine element 11, in which the expansion of the motive fluid is completed.

From the above description, it will be seen that I have provided a new arrangement of compound turbine and condenser in which the parts are more compactly arranged, thereby permitting an installation of greater capacity in a given space, or permitting apparatus of a given capacity to be disposed in a smaller space. The position of the low-pressure turbine vertically above the high-pressure turbine reduces the width of the space required by the installation; and the arrangement of the condenser below the low-pressure turbine and overlapping the high-pressure turbine in vertical extent provides a minimum requirement of head room, that is, the vertical dimension of the space required for the installation.

It is to be understood that the form of the condenser contemplated by this invention is susceptible of considerable modification without departing from the principles of the invention. The condenser illustrated has the characteristics of a single condenser in that it has but one inlet communicating with the exhaust chamber of the turbine, while it has the characteristics of two condensers in that it has separate water boxes and condensate outlet openings. The degree to which the condenser resembles a single condenser or a plurality of condensers is not material to the invention, except that the lower portions of the condenser are disposed to provide sufficient space to accommodate the high-pressure turbine or that part of the high-pressure portion which may be disposed beneath the condenser.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a compound turbine and condenser arrangement, the combination of a high-pressure turbine, a low-pressure turbine located above the high-pressure turbine, and a condenser located between said turbines, said condenser being connected to the low-pressure turbine and straddling a part of the high-pressure turbine.

2. In a compound turbine and condenser arrangement, the combination of a high-pressure portion comprising a high-pressure turbine and a machine driven thereby, a low-pressure portion arranged above and in parallel relation to the high-pressure portion and comprising a low-pressure turbine and a machine driven thereby, and a condenser for the low-pressure turbine disposed between the high-pressure and low-pressure portions and straddling a part of the high pressure portion.

3. In a compound turbine and condenser arrangement, the combination of a high-pressure portion comprising a high-pressure turbine and a machine driven thereby, a low-pressure portion arranged above and in parallel relation to the high-pressure portion and comprising a low-pressure turbine and a machine driven thereby, and a condenser for the low-pressure turbine disposed between the high-pressure and low-pressure portions and straddling a part of the high-pressure portion.

4. In a compound turbine and condenser arrangement, the combination of a high-pressure portion comprising a high-pressure turbine and a machine driven thereby, a low-pressure portion arranged above and in parallel relation to the high-pressure portion and comprising a low-pressure turbine and a machine driven thereby, and a condenser for the low-pressure turbine depending therefrom, said condenser comprising two sections extending downwardly from the low-pressure turbine and spaced from each other to provide space therebetween for access to the high-pressure portion.

5. In a compound turbine and condenser arrangement, the combination of a high-pressure turbine, a low-pressure turbine disposed above and in parallel relation to the high-pressure turbine, and a condenser connected to the low-pressure turbine, said condenser comprising two parts depending from the low-pressure turbine and arranged in spaced relation, and the upper part of the high-pressure turbine extending into the space between the condenser parts.

6. In a compound turbine and condenser arrangement, the combination of a high-pressure turbine, a low-pressure turbine disposed parallel to and above the high-pressure turbine, a condenser of bifurcated formation for the low-pressure turbine, the branches of the condenser depending from the low-pressure turbine in spaced relation to permit lifting of the high-pressure turbine cover therebetween, and a rail secured to the condenser at the apex of the space between the condenser branches and a lifting gear thereon for lifting said cover.

7. In a turbine and condenser installation, the combination of a high-pressure turbine, means for supplying motive fluid to the high-pressure turbine, a low-pressure turbine spaced from and above the high-pressure turbine, means for supplying motive fluid exhausted from the high-pressure turbine to the low-pressure turbine, condensing apparatus connected to the low-pressure turbine and disposed at least in part in the space between the turbines and overlapping the high-pressure turbine in vertical extent and being constructed and arranged to provide required space for assembly and removal of the parts of the high-pressure turbine.

8. In a compound turbine and condenser installation, the combination of a high-pressure portion comprising a high-pressure turbine and a machine driven thereby, means for supplying motive fluid to the high-pressure turbine, a low-pressure portion arranged above and in parallel relation to the high-pressure portion and comprising a low-pressure turbine and a machine driven thereby, means for supplying motive fluid exhausted from the high-pressure turbine to the low-pressure turbine, and condensing apparatus connected to the low-pressure turbine and disposed to overlap the high-pressure portion in vertical extent and being constructed and arranged to provide required space and assembly and removal of the parts of the high-pressure portion.

In testimony whereof, I have hereunto subscribed my name this 29th day of April, 1930.

FRANCIS HODGKINSON.